(12) United States Patent
Fricke et al.

(10) Patent No.: US 8,697,766 B2
(45) Date of Patent: Apr. 15, 2014

(54) PROCESS FOR PRODUCING PULVERULENT POROUS MATERIALS

(75) Inventors: Marc Fricke, Osnabrueck (DE); Mark Elbing, Bremen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/403,530

(22) Filed: Feb. 23, 2012

(65) Prior Publication Data

US 2012/0220679 A1    Aug. 30, 2012

Related U.S. Application Data

(60) Provisional application No. 61/446,081, filed on Feb. 24, 2011.

(51) Int. Cl.
- *C08G 18/32* (2006.01)
- *B02C 19/00* (2006.01)
- *C08J 9/28* (2006.01)

(52) U.S. Cl.
USPC ............................................ 521/163; 241/30

(58) Field of Classification Search
None
See application file for complete search history.

(56) References Cited

U.S. PATENT DOCUMENTS

| | | | |
|---|---|---|---|
| 5,478,867 A | 12/1995 | Tabor | |
| 5,484,818 A * | 1/1996 | De Vos et al. | 521/123 |
| 6,481,649 B1 * | 11/2002 | Schmidt | 241/3 |
| 2006/0014908 A1 * | 1/2006 | Rotermund et al. | 525/452 |
| 2010/0148109 A1 * | 6/2010 | Schadler et al. | 252/62 |
| 2011/0263737 A1 | 10/2011 | Fricke et al. | |
| 2011/0263742 A1 | 10/2011 | Zarbakhsh et al. | |
| 2011/0319508 A1 | 12/2011 | Fricke et al. | |
| 2012/0007012 A1 | 1/2012 | Fricke et al. | |
| 2012/0067499 A1 | 3/2012 | Elbing et al. | |

FOREIGN PATENT DOCUMENTS

| | | |
|---|---|---|
| DE | 10 2008 030 921 A1 | 1/2010 |
| EP | 0 026 915 A2 | 4/1981 |
| WO | WO 89/06251 A1 | 7/1989 |
| WO | WO 00/24799 | 5/2000 |
| WO | WO 2008/138978 A1 | 11/2008 |
| WO | WO 2009/027310 A1 | 3/2009 |
| WO | WO 2010/105985 A1 | 9/2010 |
| WO | WO 2011/000771 A2 | 1/2011 |
| WO | WO 2011/018371 A1 | 2/2011 |
| WO | WO 2011/045306 A1 | 4/2011 |
| WO | WO 2011/069959 A2 | 6/2011 |
| WO | WO 2012/000917 A1 | 1/2012 |

OTHER PUBLICATIONS

U.S. Appl. No. 13/381,231, filed Dec. 28, 2011, Marc Fricke, et al.
U.S. Appl. No. 13/389,969, filed Feb. 10, 2012, Marc Fricke, et al.
U.S. Appl. No. 13/289,441, filed Nov. 4, 2011, Marc Fricke, et al.
European Search Report issued Jun. 24, 2011, in European Patent Application No. 11155833.4-1217 (with English Translation of Categories of Cited Documents).
International Search Report and Written Opinion issued Feb. 1, 2012, in PCT/EP2011/068811 filed Oct. 27, 2011 with English translation of category of cited documents.
U.S. Appl. No. 13/500,664, filed Apr. 6, 2012, Prissok, et al.
U.S. Appl. No. 13/515, 139, filed Jun. 11, 2012, Fricke, et al.
U.S. Appl. No. 13/422,704, filed Mar. 16, 2012, Fricke, et al.
U.S. Appl. No. 13/432,820, filed Mar. 28, 2012, Fricke, et al.

* cited by examiner

*Primary Examiner* — Randy Gulakowski
*Assistant Examiner* — Jeffrey Washville
(74) *Attorney, Agent, or Firm* — Oblon, Spivak, McClelland, Maier & Neustadt, L.L.P.

(57) ABSTRACT

The present invention relates to a process for producing pulverulent organic porous materials, comprising (i) the provision of an organic xerogel or organic aerogel and then (ii) the comminution of the material provided in step (i).

The invention further relates to the pulverulent organic porous materials thus obtainable, to thermal insulation materials comprising the pulverulent porous organic materials, to building material and vacuum insulation panels comprising the thermal insulation materials, and to the use of the pulverulent organic porous materials or of the thermal insulation materials for thermal insulation.

17 Claims, No Drawings

PROCESS FOR PRODUCING PULVERULENT POROUS MATERIALS

CROSS REFERENCE TO RELATED APPLICATION(S)

This application claims priority to U.S. provisional application Ser. No. 61/446,081, filed Feb. 24, 2011.

The present invention relates to a process for producing pulverulent organic porous materials, comprising (i) the provision of an organic xerogel or organic aerogel based on polyurea and/or polyisocyanurate and then (ii) the comminution of the material provided in step (i).

The invention further relates to the pulverulent organic porous materials thus obtainable, to thermal insulation materials comprising the pulverulent porous organic materials, to building material and vacuum insulation panels comprising the thermal insulation materials, and to the use of the pulverulent organic porous materials or of the thermal insulation materials for thermal insulation.

Thermal insulation for saving of energy is of great significance. Thermal insulation is becoming ever more important against the background of rising energy costs and the drive for a reduction in $CO_2$ output, and also the future rise in demands on heat and cold insulation. These rising demands on optimization of thermal insulation comprise both buildings, both newbuild and existing buildings, and cold insulation in the mobile, logistics and stationary sectors.

Building materials such as steel, concrete, bricks and glass, but also natural rock, are relatively good heat conductors, and so the outer walls of buildings constructed therefrom very rapidly release heat from the inside to the outside in cold weather.

Development aims are therefore firstly improvement of the insulation properties by enhancing the porosity of these building materials, for example in the case of concrete and bricks, and secondly lining the outer walls with thermal insulation materials. However, the thermal insulation properties of the systems used commercially to date are still in need of improvement.

Very good insulating action is a feature of what are called vacuum insulation panels, VIPs for short. With a thermal conductivity of about 0.004 to 0.008 W/mK (according to the core material and reduced pressure), the thermal insulating action of the vacuum insulation panels is 8 to 25 times better than conventional thermal insulation systems. They therefore enable slim constructions with optimal thermal insulation, which can be used both in the construction sector and in the domestic appliance, cooling and logistics sectors.

Vacuum insulation panels based on porous thermal insulation materials, polyurethane foam slabs and pressed fibers as core materials with composite foils (e.g. aluminum composite foils or what are called metalized foils) are common knowledge and have been described sufficiently.

This VIP technology, however, has some serious disadvantages. When these evacuated panels are vented as a result of damage, this means the end of the very good thermal insulation. The insulating action then corresponds merely to that of the core materials used. The lifetime is limited by the diffusion of ambient gases through the barrier or shell into the vacuum panel. A further disadvantage of present vacuum insulation panels is the lack of combination of low thermal conductivity at moderate pressures and at low densities around 100 g/l.

There is accordingly a need to discover materials which, even at a pressure above the vacuum range and especially at standard pressure, have favorable thermal conductivity properties, and at simultaneously low densities.

Porous materials, for example polymer foams, with pores in the size range of a few micrometers or much lower and a high porosity of at least 70% are particularly good thermal insulators on the basis of theoretical considerations.

Such porous materials with small mean pore diameter may be present, for example, as organic xerogels. In the literature, the term "xerogel" is not always used uniformly. In general, a xerogel is understood to mean a porous material which has been produced by a sol-gel process, the liquid phase having been removed from the gel by drying below the critical temperature and below the critical pressure of the liquid phase ("subcritical conditions"). In contrast, reference is generally made to aerogels when the removal of the liquid phase from the gel has been performed under supercritical conditions.

In the sol-gel process, a sol based on a reactive organic gel precursor is first prepared and then the sol is gelated to give a gel by a crosslinking reaction. In order to obtain a porous material, for example a xerogel, from the gel, the liquid has to be removed. This step is referred to hereinafter simply as drying.

Organic porous materials in the form of xerogels or aerogels are known per se to those skilled in the art.

WO-2008/138978 discloses xerogels comprising from 30 to 90% by weight of at least one polyfunctional isocyanate and from 10 to 70% by weight of at least one polyfunctional aromatic amine, the volume-weighted mean pore diameter of which is at most 5 micrometers.

In the prior art, the organic aerogels and xerogels are obtained almost exclusively as gel bodies. The gel bodies are coherent structures and are unusable for many applications. For instance, it is barely possible to fill cavities with gel bodies. In situ production in a cavity is likewise not an option due to the solvents used.

Organic aerogels and xerogels are frequently brittle, which is a disadvantage in the further use as a gel body. On the other hand, the inexpensive production, the varied adjustability of formulations and properties, and the good thermal insulation properties support these materials. A marked advantage of the organic materials is the low density.

The possibility of further processing brittle porous materials to give a readily processable porous material with good thermal insulation properties thus constitutes a major extension to the toolbox of a person skilled in the art in the field of thermal insulation. Due to brittleness, the organic aerogels and xerogels can be comminuted or ground particularly efficiently. This ensures a high throughput in the grinding step.

In later use, the free flow and the low density of the polymeric material, both in a bed and in the compacted state, are a great advantage.

Powder beds for insulation applications, for example blow-in insulation, are likewise known to those skilled in the art. However, it has not been possible to date to process organic materials in the form of foams to powders and/or beds without adversely affecting the favorable thermal insulation properties of the underlying porous material. In the case of the known organic porous materials, the pore structure is completely destroyed after comminution.

In the case of known inorganic porous materials too, the particle size cannot be selected sufficiently freely, which restricts employability. For example, fumed silicas as porous materials are generally obtained in the form of fine dust, such that pressing and/or adhesive bonding is required for many applications.

It was therefore an object of the present invention to avoid the aforementioned disadvantages. More particularly, a porous organic material which has the aforementioned disadvantages only to a lesser degree, if at all, was to be provided. At the same time, the porous materials were to have favorable thermal conductivity under reduced pressure. Furthermore, the porous materials were also to have a low thermal conductivity at pressures above the vacuum range, especially within a pressure range from about 1 mbar to about 100 mbar. The materials were to be introducible into cavities in a simple manner and have a low density. The materials were to be producible in different particle size.

Accordingly, the process according to the invention and the porous materials thus obtainable have been found.

Preferred embodiments can be inferred from the claims and the description. Combinations of preferred embodiments do not leave the scope of this invention.

The process according to the invention for production of pulverulent organic porous materials comprises (i) the provision of an organic xerogel or organic aerogel and then (ii) the comminution of the material provided in step (i), wherein the organic porous material provided in step (i) is based on polyurea and/or polyisocyanurate.

The term "pulverulent" is used synonymously with granular material and comprises pourable and/or free-flowing material. A pulverulent material consequently differs from a coherent material, for example a gel body. Pulverulent material comprises especially a material with a number-weighted mean particle size of at most 5 mm, preferably at most 2 mm. As a result of production, the number-weighted mean particle size is, for example, at least 50 micrometers, especially at least 100 micrometers.

In the context of the present invention, a xerogel is understood to mean a porous material having a porosity of at least 70% by volume and a volume-average mean pore diameter of at most 50 micrometers, which has been produced by a sol-gel process, the liquid phase having been removed from the gel by drying below the critical temperature and below the critical pressure of the liquid phase ("subcritical conditions").

Correspondingly, an aerogel in the context of the present invention is understood to mean a porous material with a porosity of at least 70% by volume and a volume-average mean pore diameter of at most 50 micrometers, which has been produced by a sol-gel process, the liquid phase having been removed from the gel by drying above the critical temperature and above the critical pressure of the liquid phase ("supercritical conditions").

The mean pore diameter is determined by means of mercury intrusion measurement according to DIN 66133 and, in the context of the present invention, is always a volume-weighted mean value. Mercury intrusion measurement according to DIN 66133 is a porosimetry method and is conducted in a porosimeter. This involves injecting mercury into a sample of the porous material. Small pores require a higher pressure to be filled with the mercury than large pores, and the corresponding pressure/volume diagram can be used to determine a pore size distribution and the volume-weighted mean pore diameter.

The volume-weighted mean pore diameter of the porous material is preferably at most 4 micrometers. The volume-weighted mean pore diameter of the porous material is more preferably at most 3 micrometers, even more preferably at most 2 micrometers and especially at most 1 micrometer.

A minimum pore size coupled with high porosity is desirable from the point of view of low thermal conductivity. As a result of production, however, there is a practical lower limit in the volume-weighted mean pore diameter. In general, the volume-weighted mean pore diameter is at least 50 nm, preferably at least 100 nm, and more preferably at least 150 nm.

In many cases, the volume-weighted mean pore diameter is at least 200 nm, especially at least 300 nm.

Step (i)

According to the present invention, in step (i), an organic xerogel or an organic aerogel based on polyurea and/or polyisocyanurate is provided. Organic xerogels and aerogels preferred in the context of the present invention are described hereinafter.

"Based on polyurea" means that at least 50 mol %, preferably at least 70 mol %, especially at least 90 mol % of the linkages of the monomer units in the organic xerogel or aerogel are present as urea linkages. "Based on polyisocyanurate" means that at least 50 mol %, preferably at least 70 mol %, especially at least 90 mol % of the linkages of the monomer units in the organic xerogel or aerogel are present as isocyanurate linkages. "Based on polyurea and/or polyisocyanurate" means that at least 50 mol %, preferably at least 70 mol %, especially at least 90 mol % of the linkages of the monomer units in the organic xerogel or aerogel are present as urea linkages and/or isocyanurate linkages.

In a preferred embodiment, the organic aerogel or xerogel is provided in the form of a gel body in step (i), and then comminuted in step (ii).

Preferably, the organic porous material provided in step (i) is obtained in a process which comprises the following steps:
(a) reaction of at least one polyfunctional isocyanate (a1) and at least one polyfunctional aromatic amine (a2) in a solvent, optionally in the presence of water as component (a3) and optionally in the presence of at least one catalyst (a4);
(b) removing the solvent to obtain the aerogel or xerogel.

Components (a1) to (a4) used with preference in step (a) and the ratios are elucidated hereinafter.

The polyfunctional isocyanates (a1) are referred to hereinafter collectively as component (a1). Correspondingly, the polyfunctional aromatic amines (a2) are referred to hereinafter collectively as component (a2). It is obvious to the person skilled in the art that the monomer components mentioned are present in converted form in the porous material.

Functionality of a compound shall be understood in the context of the present invention to mean the number of reactive groups per molecule. In the case of monomer component (a1), the functionality is the number of isocyanate groups per molecule. In the case of the amino groups of monomer component (a2), the functionality refers to the number of reactive amino groups per molecule. A polyfunctional compound has a functionality of at least 2.

If mixtures of compounds with different functionality are used as component (a1) or (a2), the functionality of the components is calculated in each case from the number-weighted average functionality of the individual compounds. A polyfunctional compound comprises at least two of the above-mentioned functional groups per molecule.

Component (a1)

In the preferred process, at least one polyfunctional isocyanate is converted as component (a1).

In the process according to the invention, the amount of component (a1) used is preferably at least 20% by weight, especially at least 30% by weight, more preferably at least 40% by weight, even more preferably at least 55% by weight, especially at least 68% by weight, based in each case on the total weight of components (a1), (a2) and optionally (a3), which adds up to 100% by weight. In the process according to the invention, the amount of component (a1) used is also preferably at most 99.8% by weight, especially at most 99.3% by weight, more preferably at most 97.5% by weight, based in each case on the total weight of components (a1), (a2) and optionally (a3), which adds up to 100% by weight.

Useful polyfunctional isocyanates include aromatic, aliphatic, cycloaliphatic and/or araliphatic isocyanates. Such polyfunctional isocyanates are known per se or can be prepared by methods known per se. The polyfunctional isocyanates can especially also be used as mixtures, such that component (a1) in this case comprises different polyfunctional isocyanates. Polyfunctional isocyanates useful as monomer units (a1) have two (referred to hereinafter as diisocyanates) or more than two isocyanate groups per molecule of the monomer component.

Especially suitable are diphenylmethane 2,2'-, 2,4'- and/or 4,4'-diisocyanate (MDI), naphthylene 1,5-diisocyanate (NDI), toluylene 2,4- and/or 2,6-diisocyanate (TDI), 3,3'-dimethyldiphenyl diisocyanate, 1,2-diphenylethane diisocyanate and/or p-phenylene diisocyanate (PPDI), tri-, tetra-, penta-, hexa-, hepta- and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate and dicyclohexylmethane 4,4'-, 2,4'- and/or 2,2'-diisocyanate.

Preferred polyfunctional isocyanates (a1) are aromatic isocyanates. This is especially true when water is used within component (a2).

Particularly preferred polyfunctional isocyanates of component (a1) are the following embodiments:
i) polyfunctional isocyanates based on toluylene diisocyanate (TDI), especially 2,4-TDI or 2,6-TDI or mixtures of 2,4- and 2,6-TDI;
ii) polyfunctional isocyanates based on diphenylmethane diisocyanate (MDI), especially 2,2'-MDI or 2,4'-MDI or 4,4'-MDI or oligomeric MDI, which is also referred to as polyphenylpolymethylene isocyanate, or mixtures of two or three of the aforementioned diphenylmethane diisocyanates, or crude MDI which is obtained in the preparation of MDI, or mixtures of at least one oligomer of MDI and at least one of the aforementioned low molecular weight MDI derivatives;
iii) mixtures of at least one aromatic isocyanate according to embodiment i) and at least one aromatic isocyanate according to embodiment ii).

A particularly preferred polyfunctional isocyanate is oligomeric diphenylmethane diisocyanate. Oligomeric diphenylmethane diisocyanate (referred to hereinafter as oligomeric MDI) is a mixture of a plurality of oligomeric condensation products and hence derivatives of diphenylmethane diisocyanate (MDI). The polyfunctional isocyanates can preferably also be formed from mixtures of monomeric aromatic diisocyanates and oligomeric MDI.

Oligomeric MDI comprises one or more polycyclic condensation products of MDI with a functionality of more than 2, especially 3 or 4 or 5. Oligomeric MDI is known and is frequently referred to as polyphenylpolymethylene isocyanate or else as polymeric MDI. Oligomeric MDI is typically formed from a mixture of MDI-based isocyanates with different functionality. Typically, oligomeric MDI is used in the mixture with monomeric MDI.

The (mean) functionality of an isocyanate which comprises oligomeric MDI may vary within the range from about 2.2 to about 5, especially from 2.4 to 3.5, especially from 2.5 to 3. Such a mixture of MDI-based polyfunctional isocyanates with different functionalities is especially crude MDI, which is formed by phosgenation of the corresponding MDA.

Polyfunctional isocyanates or mixtures of a plurality of polyfunctional isocyanates based on MDI are known and are sold, for example, by BASF Polyurethanes GmbH under the Lupranat® name.

The functionality of component (a1) is preferably at least two, especially at least 2.2 and more preferably at least 2.4. The functionality of component (a1) is preferably from 2.2 to 4 and more preferably from 2.4 to 3.

The content of isocyanate groups of component (a1) is preferably from 5 to 10 mmol/g, especially from 6 to 9 mmol/g, more preferably from 7 to 8.5 mmol/g. The person skilled in the art is aware that the content of isocyanate groups in mmol/g and what is called the equivalent weight in g/equivalent are in a reciprocal relationship. The content of isocyanate groups in mmol/g is calculated from the content in % by weight according to ASTM D-5155-96 A.

In a preferred embodiment, component (a1) consists of at least one polyfunctional isocyanate selected from diphenylmethane 4,4'-diisocyanate, diphenylmethane 2,4'-diisocyanate, diphenylmethane 2,2'-diisocyanate and oligomeric diphenylmethane diisocyanate. In the context of this preferred embodiment, component (a1) more preferably comprises oligomeric diphenylmethane diisocyanate and has a functionality of at least 2.4.

The viscosity of component (a1) used may vary within a wide range. Component (a1) preferably has a viscosity of 100 to 3000 mPa·s, more preferably of 200 to 2500 mPa·s.

Component (a2)

In the process preferred in accordance with the invention, component (a2) is at least one polyfunctional aromatic amine.

Component (a2) may in some cases be generated in situ. In such an embodiment, the reaction in step (a) is performed in the presence of water (a3). Water reacts with the isocyanate groups to form amino groups with release of $CO_2$. Thus, polyfunctional amines are in some cases generated as an intermediate (in situ). They are converted to urea linkages later in the reaction with isocyanate groups.

In this preferred embodiment, the reaction is performed in the presence of water (a3) and a polyfunctional aromatic amine as component (a2), and optionally in the presence of a catalyst (a4).

In a further, likewise preferred embodiment, the reaction of component (a1) and a polyfunctional aromatic amine as component (a2) is optionally performed in the presence of a catalyst (a4). In this case, no water (a3) is present.

Polyfunctional aromatic amines are known per se to those skilled in the art. Polyfunctional amines are understood to mean those which have at least two amino groups reactive toward isocyanates per molecule. Amino groups reactive toward isocyanates are primary and secondary amino groups, the reactivity of the primary amino groups generally being much higher than that of the secondary amino groups.

The polyfunctional aromatic amines are preferably bicyclic aromatic compounds having two primary amino groups (bifunctional aromatic amines), corresponding tri- or polycyclic aromatic compounds having more than two primary amino groups, or mixtures of the aforementioned compounds. Preferred polyfunctional aromatic amines of component (a2) are especially isomers and derivatives of diaminodiphenylmethane.

Said bifunctional bicyclic aromatic amines are more preferably those of the general formula I

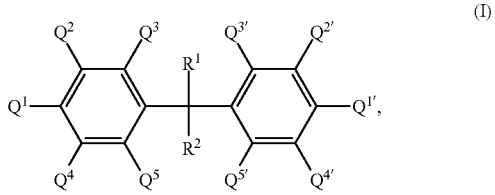

(I)

where $R^1$ and $R^2$ may be the same or different and are each independently selected from hydrogen and linear or branched alkyl groups having from 1 to 6 carbon atoms, and where all substituents $Q^1$ to $Q^5$ and $Q^{1'}$ to $Q^{5'}$ are the same or different and are each independently selected from hydrogen, a primary amino group and a linear or branched alkyl group having from 1 to 12 carbon atoms, where the alkyl group may bear further functional groups provided that the compound of the general formula I comprises at least two primary amino groups, where at least one of $Q^1$, $Q^3$ and $Q^5$ is a primary amino group and at least one of $Q^{1'}$, $Q^{3'}$ and $Q^{5'}$ is a primary amino group.

In one embodiment, the alkyl groups within the substituents Q according to the general formula I are selected from methyl, ethyl, n-propyl, isopropyl, n-butyl, sec-butyl and tert-butyl. Such compounds are referred to hereinafter as substituted aromatic amines (a2-s). However, it is likewise preferred when all substituents Q are hydrogen when they are not amino groups as defined above (so-called unsubstituted polyfunctional aromatic amines).

Preferably, $R^1$ and $R^2$ within the general formula I are the same or different and are each independently selected from hydrogen, a primary amino group and a linear or branched alkyl group having from 1 to 6 carbon atoms. Preferably, $R^1$ and $R^2$ are each selected from hydrogen and methyl. More preferably, $R^1=R^2=H$.

Suitable polyfunctional aromatic amines (a2) are also especially isomers and derivatives of toluenediamine. Isomers and derivatives of toluenediamine preferred within component (a2) are especially toluene-2,4-diamine and/or toluene-2,6-diamine and diethyltoluenediamines, especially 3,5-diethyltoluene-2,4-diamine and/or 3,5-diethyltoluene-2,6-diamine.

Most preferably, component (a2) comprises at least one polyfunctional aromatic amine selected from 4,4'-diaminodiphenylmethane, 2,4'-diaminodiphenylmethane, 2,2'-diaminodiphenylmethane and oligomeric diaminodiphenylmethane.

Oligomeric diaminodiphenylmethane comprises one or more polycyclic methylene-bridged condensation products of aniline and formaldehyde. Oligomeric MDA comprises at least one, but generally several oligomers of MDA having a functionality of more than 2, especially 3 or 4 or 5. Oligomeric MDA is known or can be prepared by methods known per se. Typically, oligomeric MDA is used in the form of mixtures with monomeric MDA.

The (mean) functionality of a polyfunctional amine of component (a2) which comprises oligomeric MDA may vary within the range from about 2.3 to about 5, especially from 2.3 to 3.5 and especially from 2.3 to 3. Such a mixture of MDA-based polyfunctional amines with different functionalities is especially crude MDA, which is the result especially of the condensation of aniline with formaldehyde, typically catalyzed by hydrochloric acid, as an intermediate of the preparation of crude MDI.

More preferably, the at least one polyfunctional aromatic amine comprises diaminodiphenylmethane or a derivative of diaminodiphenylmethane. More preferably, the at least one polyfunctional aromatic amine comprises oligomeric diaminodiphenylmethane. It is particularly preferred when component (a2) comprises oligomeric diaminodiphenylmethane as compound (a2) and has an overall functionality of at least 2.1. More particularly, component (a2) comprises oligomeric diaminodiphenylmethane and has a functionality of at least 2.4.

It is possible in the context of the present invention to control the reactivity of the primary amino groups by using substituted polyfunctional aromatic amines within component (a2). The substituted polyfunctional aromatic amines mentioned and detailed below, referred to hereinafter as (a2-s), can be used in a mixture with the abovementioned (unsubstituted) diaminodiphenylmethanes (all Q in formula I hydrogen, if not $NH_2$) or else exclusively.

In this embodiment, $Q^2$, $Q^4$, $Q^{2'}$ and $Q^{4'}$ within the formula I shown above including the corresponding definitions are preferably each selected such that the compound of the general formula I has at least one linear or branched alkyl group which may bear further functional groups having from 1 to 12 carbon atoms in the α position to at least one primary amino group bonded to the aromatic ring.

Preferably, $Q^2$, $Q^4$, $Q^{2'}$ and $Q^{4'}$ in this embodiment are selected such that the substituted aromatic amine (a2-s) comprises at least two primary amino groups, each of which has one or two linear or branched alkyl groups having from 1 to 12 carbon atoms in the α position, which may bear further functional groups. When one or more of $Q^2$, $Q^4$, $Q^{2'}$ and $Q^{4'}$ are selected such that they correspond to linear or branched alkyl groups having from 1 to 12 carbon atoms which bear further functional groups, preference is given to amino groups and/or hydroxyl groups and/or halogen atoms as such functional groups.

Preferably, the amines (a2-s) are selected from the group consisting of 3,3',5,5'-tetraalkyl-4,4'-diaminodiphenylmethane, 3,3',5,5'-tetraalkyl-2,2'-diaminodiphenylmethane and 3,3',5,5'-tetraalkyl-2,4'-diaminodiphenylmethane, where the alkyl groups in the 3,3',5 and 5' positions may be the same or different and are each independently selected from linear or branched alkyl groups having from 1 to 12 carbon atoms, which may bear further functional groups. The aforementioned alkyl groups are preferably methyl, ethyl, n-propyl, isopropyl, n-butyl, sec-butyl or t-butyl (each unsubstituted).

In one embodiment, one, more than one or all hydrogen atoms of one or more alkyl groups of the substituents Q may be replaced by halogen atoms, especially chlorine. Alternatively, one, more than one or all hydrogen atoms of one or more alkyl groups of the substituents Q may be replaced by $NH_2$ or OH. It is, however, preferred when the alkyl groups within the general formula I are formed from carbon and hydrogen.

In a particularly preferred embodiment component (a2-s) comprises 3,3',5,5'-tetraalkyl-4,4'-diaminodiphenylmethane, where the alkyl groups may be the same or different and are each independently selected from linear or branched alkyl groups having from 1 to 12 carbon atoms, which may optionally bear functional groups. Aforementioned alkyl groups are preferably selected form unsubstituted alkyl groups, especially methyl, ethyl, n-propyl, isopropyl, n-butyl, sec-butyl and tert-butyl, more preferably from methyl and ethyl. Very particular preference is given to 3,3'-5,5'-tetraethyl-4,4'-diaminodiphenylmethane and/or 3,3',5,5'-tetramethyl-4,4'-diaminodiphenylmethane.

The aforementioned polyfunctional amines of component (a2) are known per se to those skilled in the art or can be prepared by known methods. One of the known methods is the reaction of aniline or of derivatives of aniline with formaldehyde under acidic catalysis.

As explained above, water as component (a3) can partly replace the polyfunctional aromatic amine, by virtue of its reacting in situ with an amount, which in that case is calculated beforehand, of additional polyfunctional aromatic isocyanate of component (a1) to give a corresponding polyfunctional aromatic amine.

When water is used as component (a3), as detailed below, particular boundary conditions should preferably be complied with.

As already detailed above, water reacts with the isocyanate groups to give amino groups while releasing $CO_2$. Thus, polyfunctional amines are partly generated as an intermediate (in situ). Later in the reaction, they are reacted with isocyanate groups to give urea linkages. The generation of amines as intermediate leads to porous materials with high mechanical stability and low thermal conductivity. The $CO_2$ formed must not, however, disrupt the gelation so significantly that the structure of the resulting porous material is influenced in an undesirable manner. This gives rise to the above-detailed preferred upper limit for the water content based on the total weight of components (a1) to (a3), which is preferably at most 30% by weight, more preferably at most 25% by weight, especially at most 20% by weight. A water content within this range additionally leads to the advantage that any residual water need not be removed in a complex manner by drying on completion of gelation.

When water is used as component (a3), the amount of water used with preference is from 0.1 to 30% by weight, especially from 0.2 to 25% by weight, more preferably from 0.5 to 20% by weight, based in each case on the total weight of components (a1) to (a3) which adds up to 100% by weight.

Within the ranges detailed above, the preferred amount of water depends on whether a catalyst (a4) is used or not.

In a first variant which comprises the use of water, components (a1) to (a3) are reacted without the presence of a catalyst (a4). In this first embodiment, it has been found to be advantageous to use from 5 to 30% by weight, especially from 6 to 25% by weight, more preferably from 8 to 20% by weight, of water as component (a3), based in each case on the total weight of components (a1) to (a3) which adds up to 100% by weight.

In the context of this first embodiment, the aforementioned components (a1) to (a3) are preferably used in the following ratio, based in each case on the total weight of components (a1) to (a3) which adds up to 100% by weight: from 40 to 94.9% by weight, especially from 55 to 93.5% by weight, more preferably from 68 to 90% by weight, of component (a1), from 0.1 to 30% by weight, especially from 0.5 to 20% by weight, more preferably from 2 to 12% by weight, of polyfunctional aromatic amines (a2) and from 5 to 30% by weight, especially from 6 to 25, more preferably from 8 to 20% by weight, of water (a3).

A theoretical content of amino groups is calculated from the water content and the content of reactive isocyanate groups of component (a1), by assuming complete reaction of the water with the isocyanate groups of component (a1) to form a corresponding amount of amino groups and adding this content to the content resulting from component (a2) (total $n^{amine}$). The resulting use ratio of the theoretically remaining NCO groups $n^{NCO}$ in relation to the amino groups theoretically formed and used is referred to hereinafter as the theoretical use ratio $n^{NCO}/n^{amine}$ and is an equivalence ratio, i.e. a molar ratio of the particular functional groups.

In the aforementioned first variant, the theoretical use ratio (equivalence ratio) $n^{NCO}/n^{amine}$ can vary over a wide range and may especially be from 0.6 to 5. $n^{NCO}/n^{amine}$ is preferably from 1 to 1.6, especially from 1.1 to 1.4.

In a second preferred variant which comprises the use of water, components (a1) to (a3) are reacted in the presence of a catalyst (a4). In this second embodiment, it has been found to be advantageous to use from 0.1 to 15% by weight, especially from 0.2 to 15% by weight, more preferably from 0.5 to 12% by weight, of water (a3), based in each case on the total weight of components (a1) to (a3) which adds up to 100% by weight. Within the aforementioned ranges, particularly favorable mechanical properties of the resulting porous materials arise, the reason for which is a particularly favorable network structure. A higher amount of water has an adverse effect on the network structure and is disadvantageous in relation to the final properties of the porous material.

In the context of the preferred second variant, the aforementioned components (a1) to (a3) are preferably used in the following ratio, based in each case on the total weight of components (a1) to (a3) which adds up to 100% by weight: from 55 to 99.8% by weight, especially from 65 to 99.3% by weight, more preferably from 76 to 97.5% by weight, of component (a1), from 0.1 to 30% by weight, especially from 0.5 to 20% by weight, more preferably from 2 to 12% by weight, of polyfunctional aromatic amine (a2) and from 0.1 to 15% by weight, especially from 0.2 to 15, more preferably from 0.5 to 12% by weight, of water (a3).

In the aforementioned second variant, the theoretical use ratio (equivalence ratio) $n^{NCO}/n^{amine}$ is preferably from 1.01 to 5. More preferably, the equivalence ratio mentioned is from 1.1 to 3, especially from 1.1 to 2. An excess of $n^{NCO}$ over $n^{amine}$ leads in this embodiment to lower shrinkage of the porous material, especially xerogel, on removal of the solvent, and, as a result of synergistic interaction with the catalyst (a4), to an improved network structure and to improved final properties of the resulting porous material.

In the second preferred embodiment which has already been explained above, the reaction according to step (a) is effected in the absence of water (a3). Within this preferred embodiment, the components (a1) and (a2) detailed above are preferably used in the following ratio, based in each case on the total weight of components (a1) and (a2) which adds up to 100% by weight: from 20 to 80% by weight, especially from 25 to 75% by weight, more preferably from 35 to 68% by weight, of component (a1), from 20 to 80% by weight, especially from 25 to 75% by weight, more preferably from 32 to 65% by weight, of component (a2); no (a3).

Within this above-detailed embodiment, the use ratio (equivalence ratio) $n^{NCO}/n^{amine}$ is preferably from 1.01 to 5. Said equivalence ratio is more preferably from 1.1 to 3, especially from 1.1 to 2. An excess of $n^{NCO}$ over $n^{amine}$ leads, in this embodiment too, to lower shrinkage of the porous material, especially xerogel, on removal of the solvent and, as a result of synergistic interaction with the catalyst (a4), to an improved network structure and to improved final properties of the resulting porous material.

Components (a1) to (a3) are referred to collectively hereinafter as organic gel precursor (A).

Catalyst (a4)

In a first preferred embodiment, the process according to the invention is preferably performed in the presence of at least one catalyst as component (a4).

Useful catalysts include, in principle, all catalysts which are known to those skilled in the art and which accelerate the trimerization of isocyanates (called trimerization catalysts) and/or the reaction of isocyanates with amino groups (called gelling catalysts) and/or—when water is used—the reaction of isocyanates with water (called blowing catalysts).

The corresponding catalysts are known per se and have different characteristics with regard to the three reactions mentioned above. According to the characteristic, they can thus be assigned to one or more of the aforementioned types. The person skilled in the art is additionally aware that reactions other than those mentioned above can occur.

Corresponding catalysts can be characterized, inter alia, with reference to their gelling to blowing ratio, as known, for example, from Polyurethane [Polyurethanes], 3rd edition, G. Oertel, Hanser Verlag, Munich, 1993, pages 104 to 110.

When no component (a3), i.e. no water, is used, preferred catalysts have a significant activity with regard to trimerization. This has a favorable influence on the homogeneity of the network structure, which results in particularly favorable mechanical properties.

When water is used as component (a3), preferred catalysts (a4) have a balanced gelling to blowing ratio, such that the reaction of component (a1) with water is not too greatly accelerated, leading to an adverse effect on the network structure, and at the same time results in a short gelling time, such that the demolding time is advantageously short. Preferred catalysts simultaneously have significant activity with regard to trimerization. This has a favorable influence on the homogeneity of the network structure, which results in particularly favorable mechanical properties.

The catalysts may be a monomer unit (incorporable catalyst) or not be incorporable.

Component (a4) is appropriately used in the smallest effective amount. Preference is given to using amounts of 0.01 to 5 parts by weight, especially of 0.1 to 3 parts by weight, more preferably of 0.2 to 2.5 parts by weight, of component (a4), based on the total of 100 parts by weight of components (a1), (a2) and (a3).

Catalysts preferred within component (a4) are selected from the group consisting of primary, secondary and tertiary amines, triazine derivatives, organometallic compounds, metal chelates, quaternary ammonium salts, ammonium hydroxides, and alkali metal and alkaline earth metal hydroxides, alkoxides and carboxylates.

Suitable catalysts are especially strong bases, for example quaternary ammonium hydroxides, for example tetraalkylammonium hydroxides having 1 to 4 carbon atoms in the alkyl radical and benzyltrimethylammonium hydroxide, alkali metal hydroxides, for example potassium hydroxide or sodium hydroxide, and alkali metal alkoxides, for example sodium methoxide, potassium ethoxide and sodium ethoxide, and potassium isopropoxide.

Suitable catalysts are also especially alkali metal salts of carboxylic acids, for example potassium formate, sodium acetate, potassium acetate, potassium 2-ethylhexanoate, potassium adipate and sodium benzoate, alkali metal salts of long-chain fatty acids having 8 to 20, especially 10 to 20, carbon atoms and optionally lateral OH groups.

Suitable catalysts are also especially N-hydroxyalkyl quaternary ammonium carboxylates, for example trimethylhydroxypropylammonium formate.

Organometallic compounds are known per se to those skilled in the art, especially as gelling catalysts, and are likewise suitable as catalysts (a4). Organotin compounds, for example tin 2-ethylhexanoate and dibutyltin dilaurate, are preferred within component (a4).

Tertiary amines are known per se to those skilled in the art as gelling catalysts and as trimerization catalysts. Tertiary amines are particularly preferred as catalysts (a4). Preferred tertiary amines are especially N,N-dimethylbenzylamine, N,N'-dimethylpiperazine, N,N-dimethylcyclohexylamine, N,N',N"-tris(dialkylaminoalkyl)-s-hexahydrotriazines, for example N,N',N"-tris(dimethylaminopropyl)-s-hexahydrotriazine, tris(dimethylaminomethyl)phenol, bis(2-dimethylaminoethyl)ether, N,N,N,N,N-pentamethyldiethylenetriamine, methylimidazole, dimethylimidazole, dimethylbenzylamine, 1,6-diazabicyclo[5.4.0]undec-7-ene, triethylamine, triethylenediamine (IUPAC: 1,4-diazabicyclo[2.2.2]octane), dimethylaminoethanolamine, dimethylaminopropylamine, N,N-dimethylaminoethoxyethanol, N,N,N-trimethylaminoethylethanolamine, triethanolamine, diethanolamine, triisopropanolamine and diisopropanolamine.

Catalysts particularly preferred within component (a4) are selected from the group consisting of N,N-dimethylcyclohexylamine, bis(2-dimethylaminoethyl)ether, N,N,N,N,N-pentamethyldiethylenetriamine, methylimidazole, dimethylimidazole, dimethylbenzylamine, 1,6-diazabicyclo[5.4.0]undec-7-ene, tris(dimethylaminopropyl)hexahydrotriazine, triethylamine, tris(dimethylaminomethyl)phenol, triethylenediamine(diazabicyclo[2.2.2]octane), dimethylaminoethanolamine, dimethylaminopropylamine, N,N-dimethylaminoethoxyethanol, N,N,N-trimethylaminoethylethanolamine, triethanolamine, diethanolamine, triisopropanolamine, diisopropanolamine, metal acetylacetonates, ammonium ethylhexanoate and metal ion ethylhexanoates.

The use of the catalysts (a4) preferred in the context of the present invention leads to porous materials with improved mechanical properties, especially to improved compressive strength. In addition, use of the catalysts (a4) reduces the gelling time, i.e. accelerates the gelling reaction, without adversely affecting other properties.

Solvent

According to the present invention, the reaction takes place in the presence of a solvent.

In the context of the present invention, the term "solvent" comprises liquid diluents, i.e. both solvents in the narrower sense and dispersants. The mixture may especially be a true solution, a colloidal solution or a dispersion, for example an emulsion or suspension. The mixture is preferably a true solution. The solvent is a compound which is liquid under the conditions of step (a), preferably an organic solvent.

Useful solvents include in principle an organic compound or a mixture of several compounds, the solvent being liquid under the temperature and pressure conditions under which the mixture is provided (solution conditions for short). The composition of the solvent is selected such that it is capable of dissolving or dispersing, preferably of dissolving, the organic gel precursor. Preferred solvents are those which are solvent for the organic gel precursor (A), i.e. those which fully dissolve the organic gel precursor (A) under reaction conditions.

The reaction product of the reaction in the presence of the solvent is at first a gel, i.e. a viscoelastic chemical network which is swollen by the solvent. A solvent which is a good swelling agent for the network formed generally leads to a network with fine pores and small mean pore diameter, whereas a solvent which is a poor swelling agent for the resulting gel generally leads to a coarse-pore network with large mean pore diameter.

The selection of the solvent thus influences the target pore size distribution and the target porosity. The solvent is additionally generally selected such that there is very substantially no occurrence of precipitation or flocculation as a result of formation of a precipitated reaction product during or after step (a) of the process according to the invention.

In the case of selection of a suitable solvent, the proportion of precipitated reaction product is typically less than 1% by weight, based on the total weight of the mixture. The amount of precipitated product formed in a particular solvent can be determined gravimetrically, by filtering the reaction mixture through a suitable filter before it reaches the gelling point.

Useful solvents include the solvents known from the prior art for isocyanate-based polymers. Preferred solvents are those which are solvent for components (a1), (a2) and optionally (a3), i.e. those which substantially fully dissolve the constituents of components (a1), (a2) and optionally (a3) under reaction conditions. The solvent is preferably inert, i.e. unreactive, toward component (a1).

Useful solvents include, for example, ketones, aldehydes, alkyl alkanoates, amides such as formamide and N-methylpyrrolidone, sulfoxides such as dimethyl sulfoxide, aliphatic and cycloaliphatic halogenated hydrocarbons, halogenated aromatic compounds and fluorinated ethers. Likewise useful are mixtures of two or more of the aforementioned compounds.

Further useful solvents are acetals, especially diethoxymethane, dimethoxymethane and 1,3-dioxolane.

Dialkyl ethers and cyclic ethers are likewise suitable as solvents. Preferred dialkyl ethers are especially those having 2 to 6 carbon atoms, especially methyl ethyl ether, diethyl ether, methyl propyl ether, methyl isopropyl ether, propyl ethyl ether, ethyl isopropyl ether, dipropyl ether, propyl isopropyl ether, diisopropyl ether, methyl butyl ether, methyl isobutyl ether, methyl t-butyl ether, ethyl n-butyl ether, ethyl isobutyl ether and ethyl t-butyl ether. Preferred cyclic ethers are especially tetrahydrofuran, dioxane and tetrahydropyran.

Preferred solvents are also alkyl alkanoates, especially methyl formate, methyl acetate, ethyl formate, butyl acetate and ethyl acetate. Preferred halogenated solvents are described in WO 00/24799, page 4 lines 12 to page 5 line 4.

Aldehydes and/or ketones are preferred as solvents. Aldehydes or ketones suitable as solvents are especially those corresponding to the general formula $R^2-(CO)-R^1$ where $R^1$ and $R^2$ are each hydrogen or alkyl groups having 1, 2, 3 or 4 carbon atoms. Suitable aldehydes or ketones are especially acetaldehyde, propionaldehyde, n-butyraldehyde, isobutyraldehyde, 2-ethylbutyraldehyde, valeraldehyde, isopentaldehyde, 2-methylpentaldehyde, 2-ethylhexaldehyde, acrolein, methacrolein, crotonaldehyde, furfural, acrolein dimer, methacrolein dimer, 1,2,3,6-tetrahydrobenzaldehyde, 6-methyl-3-cyclohexenaldehyde, cyanacetaldehyde, ethyl glyoxylate, benzaldehyde, acetone, methyl isobutyl ketone, diethyl ketone, methyl ethyl ketone, methyl n-butyl ketone, ethyl isopropyl ketone, 2-acetylfuran, 2-methoxy-4-methylpentan-2-one, cyclohexanone and acetophenone. The aforementioned aldehydes and ketones can also be used in the form of mixtures. Ketones and aldehydes having alkyl groups with up to 3 carbon atoms per substituent are particularly preferred as solvent. Very particular preference is given to ketones of the general formula $R^1(CO)R^2$, where $R^1$ and $R^2$ are each independently selected from alkyl groups having 1 to 3 carbon atoms. In a first preferred embodiment, the ketone is acetone. In a further preferred embodiment, at least one of the two substituents $R^1$ and/or $R^2$ comprises an alkyl group having at least 2 carbon atoms, especially methyl ethyl ketone. Use of the aforementioned particularly preferred ketones in combination with the process according to the invention affords porous materials with particularly small mean particle diameter. Without wishing to impose any restriction, it is thought that the pore structure of the gel which forms has particularly fine pores due to the higher affinity of the aforementioned particularly preferred ketones.

In many cases, particularly suitable solvents result from use of two or more compounds completely miscible with one another, selected from the aforementioned solvents, in the form of a mixture.

In order to obtain, in step (a), a sufficiently stable gel which does not shrink too greatly in the course of drying in step (b), the proportion of components (a1) to (a3) in the total weight of components (a1) to (a3) and the solvents, which adds up to 100% by weight, must generally not be less than 5% by weight. Preferably, the proportion of components (a1) to (a3) in the total weight of components (a1) to (a3) and the solvent, which adds up to 100% by weight, is at least 6% by weight, more preferably at least 8% by weight, especially at least 10% by weight.

On the other hand, the selected concentration of components (a1) to (a3) in the mixture provided must not be too high since a porous material with favorable properties is otherwise not obtained. In general, the proportion of components (a1) to (a3) in the total weight of components (a1) to (a3) and the solvent, which adds up to 100% by weight, is at most 40% by weight. The proportion of components (a1) to (a3) in the total weight of components (a1) to (a3) and the solvent, which adds up to 100% by weight, is preferably at most 35% by weight, more preferably at most 25% by weight, especially at most 20% by weight.

The proportion by weight of components (a1) to (a3) in the total weight of components (a1) to (a3) and of the solvent, which adds up to 100% by weight, preferably totals from 8 to 25% by weight, especially from 10 to 20% by weight, more preferably from 12 to 18% by weight. Compliance with the amount of the feedstocks within the range mentioned leads to porous materials with particularly favorable pore structure, low thermal conductivity and low shrinkage on drying.

The reaction according to step (a) of the process according to the invention is preferably preceded by the provision of components (a1), (a2), optionally (a3) and optionally (a4), and of the solvent.

Preferably, components (a1) on the one hand, and (a2) and optionally (a3) and optionally (a4) on the other hand, are each provided separately in a suitable portion of the solvent. The separate provision enables optimal control of the gelling reaction before and during the mixing.

When water is used as component (a3), component (a3) is more preferably provided separately from component (a1). This avoids the reaction of water with component (a1) to form networks without the presence of component (a2). Otherwise, the prior mixing of water with component (a1) leads to less favorable properties in relation to the homogeneity of the pore structure and the thermal conductivity of the resulting materials.

The mixture or mixtures provided before performance of step (a) may also comprise customary assistants known to those skilled in the art as further constituents. Examples include surface-active substances, nucleators, oxidation stabilizers, sliding and demolding aids, dyes and pigments, stabilizers, for example against hydrolysis, light, heat or discoloration, inorganic and/or organic fillers, reinforcers and biocides.

Further details of the assistants and additives mentioned above can be found in the specialist literature, for example in Plastics Additive Handbook, 5th edition, H. Zweifel, ed. Hanser Publishers, Munich, 2001, 104-127.

In order to perform the reaction according to step (a) of the preferred process, it is first necessary to produce a homogeneous mixture of components provided prior to the reaction according to step (a).

The components converted within step (a) can be provided in a customary manner. For this purpose, preference is given to using a stirrer or another mixing apparatus in order to achieve good and rapid mixing. The time required to obtain the homogeneous mixture should be small in relation to the time within which the gelling reaction leads to the at least partial formation of a gel, in order to avoid mixing faults. The other mixing conditions are generally uncritical; for example, it is possible to mix at 0 to 100° C. and 0.1 to 10 bar (absolute), especially, for example, at room temperature and atmospheric pressure. On completion of production of a homogeneous mixture, the mixing apparatus is preferably switched off.

The gelling reaction is a polyaddition reaction, more particularly a polyaddition of isocyanate groups and amino groups.

A gel shall be understood to mean a crosslinked system based on a polymer which is in contact with a liquid (called solvogel or lyogel, or with water as the liquid: aquagel or hydrogel). The polymer phase forms a continuous three-dimensional network.

In the course of step (a) of the process according to the invention, the gel typically forms by standing, for example by simply leaving the container, reaction vessel or reactor containing the mixture to stand (referred to hereinafter as gelling apparatus). Preferably, the mixture is not stirred or mixed during the gelling (gel formation) because this could hinder the formation of the gel. It has been found to be advantageous to cover the mixture during gelling, or to close the gelling apparatus.

Gelling is known per se to those skilled in the art and is described, for example, in WO-2009/027310 on page 21 line 19 to page 23 line 13.

In the preferred process, the solvent is removed within step (b) (drying). In principle, drying under supercritical conditions is an option, preferably after exchange of the solvent for $CO_2$ or other solvents suitable for the purposes of supercritical drying. Such drying is known per se to those skilled in the art. Supercritical conditions indicate a temperature and a pressure at which the fluid phase to be removed is in the supercritical state. This allows the shrinkage of the gel body on removal of the solvent to be reduced. The material obtained from the supercritical drying is referred to as aerogel.

However, in view of the simple process regime, it is preferred to dry the resulting gels by conversion of the liquid present in the gel to the gaseous state at a temperature and a pressure below the critical temperature and the critical pressure of the liquid present in the gel. The material obtained from the subcritical drying is referred to as xerogel.

The resulting gel is preferably dried by converting the solvent to the gaseous state at a temperature and a pressure below the critical temperature and the critical pressure of the solvent. Accordingly, the drying is preferably effected by removing the solvent which was present in the reaction without previous exchange for a further solvent.

Corresponding methods are likewise known to those skilled in the art and are described in WO-2009/027310 at page 26 line 22 to page 28 line 36.

In the case of subcritical drying, the shrinkage of the gel body is particularly pronounced. It is an advantage of the present invention that shrinkage is minimized in the course of drying.

Step (ii)

According to step (ii) of the present invention, the organic porous material provided beforehand is comminuted.

The comminution can be effected in one stage or in a plurality of stages, in the latter case in one or more different apparatuses. For example, the material used can be subjected first to a precomminution and then to a postcomminution. A postcomminution can advantageously be effected in a granulator.

Useful apparatuses for comminution include especially screw crushers, rotary shredders, single-shaft and multishaft crushers, roll mills, fine mills, pulverizers, impact disk mills and hammer mills.

Processes and apparatuses for comminution of organic materials are widely known to those skilled in the art. The person skilled in the art selects a suitable apparatus as a function of the amount to be comminuted, the desired throughput, the particle size to be achieved and the brittleness of the material used.

For the comminution of the organic porous aerogels and xerogels used in accordance with the invention, universal rotor mills in particular have been found to be suitable.

The material obtained in step (ii) preferably has a number-weighted mean particle size of at most 2000 micrometers, especially at most 1500 micrometers. At the same time, the material obtained in step (ii) preferably has a number-weighted mean particle size of at least 50 micrometers, especially at most 100 micrometers. Processes for determining particle size are known to those skilled in the art. For example, particle size can be determined by air classification.

Use

The invention further relates to pulverulent organic nanoporous material obtainable by the process according to the invention.

The inventive pulverulent organic porous materials can be used as thermal insulation materials as such or in a mixture with further functional components. An inventive thermal insulation material is accordingly a blend comprising the inventive pulverulent organic porous materials. The selection of suitable functional components as additives depends on the field of use.

The invention also relates to building materials and vacuum insulation panels comprising the pulverulent organic porous materials, and to the use of the inventive pulverulent organic porous materials for thermal insulation. The materials obtainable in accordance with the invention are preferably used for thermal insulation especially in built structures, or for cold insulation especially in the mobile, logistics or stationary sectors, for example in cooling equipment or for mobile applications.

Possible further components of these thermal insulation materials are, for example, compounds which can absorb, scatter and reflect heat rays in the infrared range, especially within the wavelength range between 3 and 10 μm. They are generally referred to as infrared opacifiers. The particle size of these particles is preferably from 0.5 to 15 micrometers. Examples of such substances are especially titanium oxides, zirconium oxides, ilmenites, iron titanates, iron oxides, zirconium silicates, silicon carbide, manganese oxides, graphites and carbon black.

For mechanical reinforcement, fibers can be used as additives. These fibers may be of inorganic or organic origin. Examples of inorganic fibers are preferably glass wool, rock wool, basalt fibers, slag wool, ceramic fibers which consist of melts of aluminum and/or silicon dioxide and further inorganic metal oxides, and pure silicon dioxide fibers, for example silica fibers. Organic fibers are preferably, for example, cellulose fibers, textile fibers or polymer fibers. The following dimensions are used: diameter preferably 1-12 micrometers, especially 6-9 micrometers; length preferably 1-25 mm, especially 3-10 mm.

For technical and economic reasons, inorganic filler materials can be added to the mixture. Preference is given to using various synthetically produced polymorphs of silicon dioxide, for example precipitated silicas, light arc silicas, $SiO_2$-containing fly dusts resulting from oxidations of volatile silicon monoxide in the electrochemical production of silicon or ferrosilicon. Likewise silicas which are prepared by leaching of silicates such as calcium silicate, magnesium silicate and mixed silicates, for example olivine (magnesium iron silicate), with acids. Also used are naturally occurring $SiO_2$-containing compounds such as diatomaceous earths and kieselguhrs. It is likewise possible to use: thermally expanded minerals such as preferably perlites and vermiculites. If required, preferably fine metal oxides, such as preferably aluminum oxide, titanium dioxide, iron oxide, can be added.

The blending of the inventive thermal insulation materials can generally take place in various mixing equipment. However, preference is given to using planetary mixers. It is advantageous in this case first to premix the fibers with a portion of the second mixing components as a kind of masterbatch, in order thus to ensure complete digestion of the fibers. Fiber digestion is followed by the addition of the majority of the mixing components.

After the mixing operation has ended, the bulk density of the mixture, according to the type and amount of components, may be between preferably 40-180 g/l, preferably 40-90 g/l. The flowability of the resulting porous mixture is very good, such that it can be pressed to slabs and also be introduced and pressed into the cavities of hollow bricks, without any problem and homogeneously. In the case of pressing to slabs, by specifying particular plate thicknesses, via the weight, the density and consequently also the coefficient of thermal conductivity of the insulation material can be influenced significantly. The lower the density of the slabs, the lower the coefficient of thermal conductivity, and the better the thermal insulation properties.

The inventive materials used in thermal insulation materials can preferably be used in the following fields of use: as insulation in hollow bricks, as core insulation in multishell bricks, as core insulation for vacuum insulation panels (VIPs), as core insulation for exterior insulation finishing systems (EIFS), and as insulation in cavity walls, especially in blow-in insulation.

The invention further provides moldings, bricks, building material systems and composite building material systems which comprise the inventive thermal insulation materials, said moldings, bricks, building material systems and composite building material systems consisting partly or fully of the thermal insulation materials. The present invention further provides vacuum insulation panels which comprise the inventive thermal insulation materials or the inventive pulverulent organic porous materials. In addition, the inventive thermal insulation materials and the inventive pulverulent organic porous materials are especially suitable for insulation of extruded hollow profiles, especially as core material for insulation in window frames.

The inventive thermal insulation materials and the inventive pulverulent organic porous materials are also especially suitable as core materials for vacuum insulation panels which are used for thermal insulation in motor vehicle construction. This makes it possible to produce, for example, flat inner lining parts for motor vehicle construction which have favorable thermal insulation properties. It has been found to be particularly advantageous to use the inventive pulverulent materials for this purpose since the corresponding motor vehicle parts must meet high demands in relation to a complex shape or in relation to a complex structure.

According to the invention, the above-described porous thermal insulation materials are used in hollow bricks.

Hollow bricks are building elements which have one or more cavities. They may consist of inorganic ceramic materials, such as fired clay (brick), concrete, glass, gypsum, and natural products such as natural stone, for example lime-sand brick. Preference is given to using hollow bricks made of fired clay, concrete and lightweight concrete. Embodiments are wall bricks, floor slabs, roof elements and extension elements.

It is known that the cavities of these building elements can be filled with porous cavity-structured insulation materials such as Styropor foam or perlite foam. These building elements are referred to as hollow bricks with integrated thermal insulation.

The use of these hollow bricks with integrated thermal insulation in brickwork is intended to ensure particularly high thermal insulation and favorable water vapor perviosity, and also barely any water absorption; an additional intention is to promote heat storage.

The inventive use of the porous thermal insulation materials described in hollow bricks significantly improves the thermal insulation properties of these bricks and keeps them at a sustained high level.

According to the invention, the corresponding thermal insulation materials can be pressed to slabs of exact size and integrated into the chambers of the hollow bricks. Alternatively, slabs of exact size can be cut out of large slabs produced beforehand and integrated into the bricks.

Likewise possible is fixing of the slabs in the cavities by means of preferably polyurethane foam or other adhesive foams, or adhesives. Equally, enveloping with nonwoven materials, in order to prevent, for example, mechanical influences and hence also escape of the thermal insulation in the form of dust, can be undertaken.

In order to optimally utilize the efficacy of the thermal insulations attainable in relation to viability, combinations between high-efficiency porous thermal insulation with conventional thermal insulation systems having lower thermal insulation efficiencies are possible. Equally, according to the use and insulation capacity, individual or plural hollow chambers can also be provided without thermal insulation materials.

EXAMPLES

The thermal conductivity was determined by means of the dynamic hot wire method. In the hot wire method, a thin wire is embedded into the sample to be analyzed, which serves simultaneously as the heating element and temperature sensor. The wire material used was a platinum wire with a diameter of 100 micrometers and a length of 40 mm, which was embedded between two halves of the particular specimen. The test setup composed of sample and hot wire was prepared in an evacuable recipient in which, after the evacuation, the desired pressure was established by admitting gaseous nitrogen.

The following compounds were used:

Component (a1): oligomeric MDI (Lupranat® M50) with an NCO content of 31.5 g per 100 g to ASTM D-5155-96 A, a functionality in the range from 2.8 to 2.9 and a viscosity of 550 mPa·s at 25° C. to DIN 53018 (hereinafter "compound M50").

Component (a2): 3,3',5,5'-tetraethyl-4,4'-diaminodiphenylmethane (hereinafter "MDEA")

Catalyst (a4): triethanolamine

The carbon black used was acetylene carbon black from ABCR with a density of 200 g/l and a specific surface area of 80 g/m$^2$, CAS No. 7440-44-0.

Example 1

64 g of compound M50 were dissolved in 210 g of acetone in a beaker at 20° C. while stirring. 4 g of compound MDEA, 2 g of triethanolamine and 8 g of water were dissolved in 210 g of acetone in a second beaker. The two solutions were mixed while stirring. This gave a clear, low-viscosity mixture. The mixture was left to cure at room temperature for 24 hours. Subsequently, the gel was taken from the beaker and the liquid (acetone) was removed by drying at 20° C. for seven days. The dried gel was ground by means of a universal rotor mill to a powder with a bulk density of 60 g/l.

The thermal conductivity of the powder with a bulk density of 60 g/l was 5.7 mW/m*K at a pressure of 0.2 mbar, and 29.5 mW/m*K at a pressure of 1000 mbar.

Example 2

The powder thus obtained was mixed with 2% by weight of carbon black. The thermal conductivity of the powder comprising carbon black and having a bulk density of 60 g/l was 6.0 mW/m*K at a pressure of 0.7 mbar, and 28 mW/m*K at a pressure of 1000 mbar.

The invention claimed is:

1. A process for producing a pulverulent organic porous material, the process comprising:
   comminuting an organic xerogel or an organic aerogel, thereby obtaining the pulverulent organic porous material,
   wherein
   the organic xerogel or the organic aerogel is based on polyurea, polyisocyanurate, or both;
   the organic xerogel or the organic aerogel is obtained in a process comprising:
      reacting at least one polyfunctional isocyanate a1 and at least one polyfunctional aromatic amine a2 in a solvent, optionally in the presence of water a3 and optionally in the presence of at least one catalyst a4, and
      removing the solvent to obtain the organic aerogel or the organic xerogel;
   the at least one polyfunctional aromatic amine a2 comprises a structure of formula I:

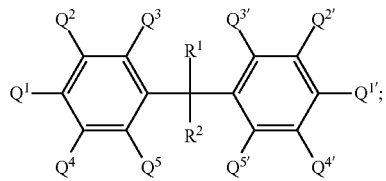

(I)

$R^1$ and $R^2$ each is independently a hydrogen, or a linear or branched alkyl group comprising from 1 to 6 carbon atoms;

each of all substituents $Q^1$ to $Q^5$ and $Q^{1'}$ to $Q^{5'}$ is independently selected from the group consisting of hydrogen, a primary amino group and a linear or branched alkyl group comprising from 1 to 12 carbon atoms;

at least one of $Q^1$, $Q^3$ and $Q^5$ is a primary amino group;

at least one of $Q^{1'}$, $Q^{3'}$ and $Q^{5'}$ is a primary amino group; and the alkyl group comprising from 1 to 12 carbon atoms in $Q^1$ to $Q^5$ and $Q^{1'}$ to $Q^{5'}$ optionally comprises additional functional groups.

2. The process according to claim 1, wherein the organic aerogel or the organic xerogel is in a form of a gel body.

3. The process according to claim 1, wherein the organic xerogel or the organic aerogel has a volume-weighted mean pore size of from 50 to 3000 nm.

4. The process according to claim 1, wherein said comminuting is performed by grinding in a mill.

5. The process according to claim 1, wherein the pulverulent organic porous material has a number-weighted mean particle size of from 50 to 2000 micrometers.

6. The process according to claim 1, wherein the at least one polyfunctional isocyanate a1 comprises oligomeric diphenylmethane diisocyanate and has a functionality of at least 2.4.

7. The process according to claim 1, wherein at least one of $Q^2$, $Q^4$, $Q^{2'}$ and $Q^{4'}$ is a linear or branched alkyl group comprising from 1 to 12 carbon atoms and optionally comprising additional functional groups.

8. The process according to claim 1, wherein the at least one polyfunctional aromatic amine a2 comprises: 4,4'-diaminodiphenylmethane, 2,4'-diaminodiphenylmethane, 2,2'-diaminodiphenylmethane, or an oligomeric diaminodiphenylmethane.

9. The process according to claim 1, wherein said reacting is performed in the presence of a catalyst.

10. The process according to claim 1, wherein said reacting is performed in the presence of water a3 and optionally in the presence of a catalyst a4.

11. The process according to claim 1, wherein said reacting is performed in the absence of water a3.

12. A pulverulent organic porous material obtained by the process according to claim 1.

13. A thermal insulation material comprising the pulverulent organic porous material according to claim 12.

14. A building material comprising the thermal insulation material according to claim 13.

15. A vacuum insulation panel comprising the thermal insulation material according to claim 13.

16. The process according to claim 1, comprising:
   comminuting the organic xerogel, thereby obtaining the pulverulent organic porous material.

17. The process according to claim 1, comprising:
   comminuting the organic aerogel, thereby obtaining the pulverulent organic porous material.

* * * * *